United States Patent
Sealy et al.

(10) Patent No.: US 6,483,113 B1
(45) Date of Patent: Nov. 19, 2002

(54) DATA COLLECTION IN SPECTROSCOPY

(75) Inventors: George Robert Sealy, Mitcham (GB); Simon Adrian Wells, Weston Turville (GB)

(73) Assignee: Wellesley Inernational C.V. (CH)

( * ) Notice: Subject to any disclaimer, the term of this patent is extended or adjusted under 35 U.S.C. 154(b) by 0 days.

(21) Appl. No.: 09/383,239

(22) Filed: Aug. 26, 1999

(30) Foreign Application Priority Data

Aug. 28, 1998 (EP) .............................................. 98306920

(51) Int. Cl.[7] .............................................. G01N 21/35
(52) U.S. Cl. .................... 250/339.08; 356/451
(58) Field of Search ....................... 250/339.08; 356/451

(56) References Cited

U.S. PATENT DOCUMENTS

| | | | | |
|---|---|---|---|---|
| 3,639,738 A | * | 2/1972 | Laukien | 702/76 |
| 4,514,822 A | * | 4/1985 | Schneider et al. | 702/31 |
| 4,640,617 A | * | 2/1987 | Hughes et al. | 356/326 |
| 5,374,395 A | | 12/1994 | Robinson et al. | 422/64 |
| 5,710,627 A | | 1/1998 | Inoue et al. | 356/328 |
| 5,710,631 A | | 1/1998 | Bou-Ghannam et al. | 356/351 |
| 5,838,438 A | * | 11/1998 | Peale et al. | 356/451 |

FOREIGN PATENT DOCUMENTS

| | | |
|---|---|---|
| EP | 0277720 | 8/1988 |
| EP | 0841557 | 5/1998 |

* cited by examiner

*Primary Examiner*—Constantine Hannaher
(74) *Attorney, Agent, or Firm*—St. Onge Steward Johnston & Reens LLC

(57) ABSTRACT

A spectrometer, typically an FT-IR spectrometer, is operated in a continuous mode so that it is carrying out scans on a continuous basis. The acquired data is stored and can be retrieved when a sample measurement is made. This improves the response of the instrument.

11 Claims, 6 Drawing Sheets

DATA COLLECTION IN SPECTROSCOPY

FIELD OF THE INVENTION

This invention relates to spectrometers. The invention has particular but not exclusive application to infra-red spectrometers such as FT-IR spectrometers.

BACKGROUND ART

In for example an FT-IR spectrometer infra-red or near infra-red radiation is directed from a source of such radiation towards the sample under investigation. Radiation transmitted by and/or reflected from the sample is received at a detector or receiver and the output of the detector is processed by a signal processor in order to obtain the spectral characteristics of the sample. A typical FT-IR instrument will include an interferometer of the Michelson type for producing a scanning beam which is directed towards the sample to be investigated. Modem spectrometers include powerful signal processors which can carry out Fourier Transform computations on data received from the detector in order to provide spectral data relating to the sample under investigation.

Conventionally in carrying out measurements it is first necessary to obtain a background measurement or measurements, that is to say to measure a background spectrum without a sample in place at the sample station of the instrument. Subsequently measurements are made with the sample in place and the desired sample spectrum is obtained from the ratio of the measurement obtained with the sample in place to the background measurement.

Thus in routine spectrometer operation where the instrument is used to perform identical measurements on either new samples of the same material or samples of similar materials a typical operator sequence will be as follows:

1. prepare sample
2. mount sample either directly or in a sampling accessory
3. perform measurement
4. interpret result.

Each of these operations takes a finite amount of time which affects the apparent response of the instrument.

SUMMARY OF THE INVENTION

The present invention is concerned with a spectrometer and a method of operating a spectrometer which is designed to improve that response.

According to one aspect of the present invention there is provided a method of operating a spectrometer which comprises a source of analysing radiation a detector for detecting the analysing radiation and processing means for processing the output of the detector, said method comprising arranging the spectrometer so that it carries out scans on a continuous basis storing spectral data from at least some of the scans, and retrieving an item or items of stored data when carrying out a sample measurement.

The method may comprise the step of inserting a sample into the sample station of the spectrometer and generating under operator control an instruction to initiate a scan.

The method may include the step of associating with the stored data, data indicative of a characteristic of the stored data. The characteristic may be the detected beam energy. The method may comprise arranging the processor so that it recognises automatically the introduction of the sample and carries out a measurement accordingly.

According to another aspect of the present invention there is provided a spectrometer comprising a source of analysing radiation a detector for detecting the analysing radiation and processing means for processing the output of the detector wherein said spectrometer is arranged so that it carries out scans on a continuous basis, and said processor stores spectral data from at least some of the scans and retrieving an item or items of stored data when carrying out a sample measurement.

BRIEF DESCRIPTION OF THE DRAWINGS

The invention will be described now by way of example only with particular reference to the accompanying drawings. In the drawings

DETAILED DESCRIPTION OF THE PREFERRED EMBODIMENT

Figure 1:
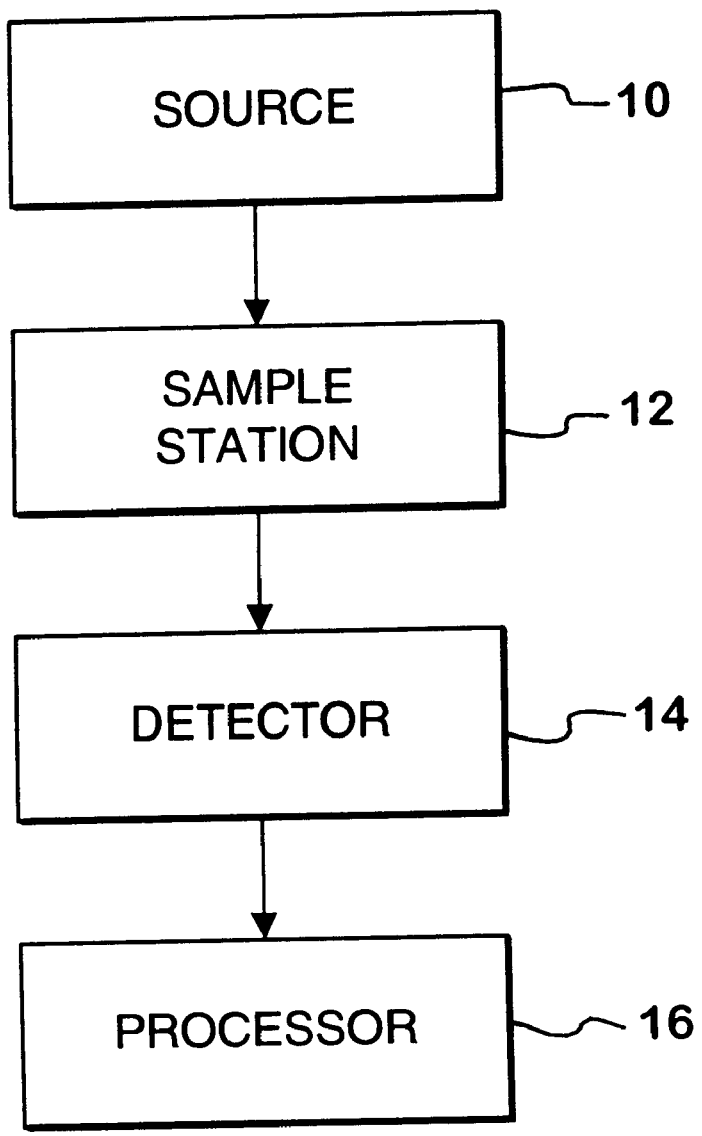
FIG. 1 is a block schematic illustration of an infra-red spectrometer with which the present invention can be implemented.

Referring to FIG. 1 of the drawings an infra-red spectrometer of the single beam type such as an FT-IR spectrometer, in very general terms comprises a source 10 of analysing radiation which is arranged to produce a beam of infra-red radiation which is directed to a sample station 12. Radiation from the sample station 12 is received at a detector or receiver 14 and the output of the receiver is processed by a processor 16 to provide data representative of the spectrum of a sample under investigation. The spectrometer can operate in conjunction with an associated PC. An FT-IR spectrometer generally uses a Michelson interferometer to produce an interference pattern of light. The interferometer comprises a beam splitter which is a partial reflector that splits the incoming beam into two beams. These beams are reflected back and recombined at the beam splitter and the path length of one of the beams is varied with time to produce a time-varied interference pattern. This light pattern is directed through an angle selecting aperture to produce a beam which is used to investigate the sample at the sample station.

The processor inter alia carries out Fourier Transform computations on data received from the detector and produces output spectral data relating to the sample under investigation. This general arrangement and operation will be known to those skilled in the art and will not be described here in any more detail.

The operation of embodiments in accordance with the present invention will be illustrated by first describing the conventional way in which measurements are obtained from an arrangement of the type shown in FIG. 1.

When the spectrometer is operated the interferometer is used to perform what are known as scans. A complete scan is represented by a forward and backward movement of the moveable mirror of the interferometer and thus, a complete scan can be considered as a forward scan and a reverse scan.

Figure 2:
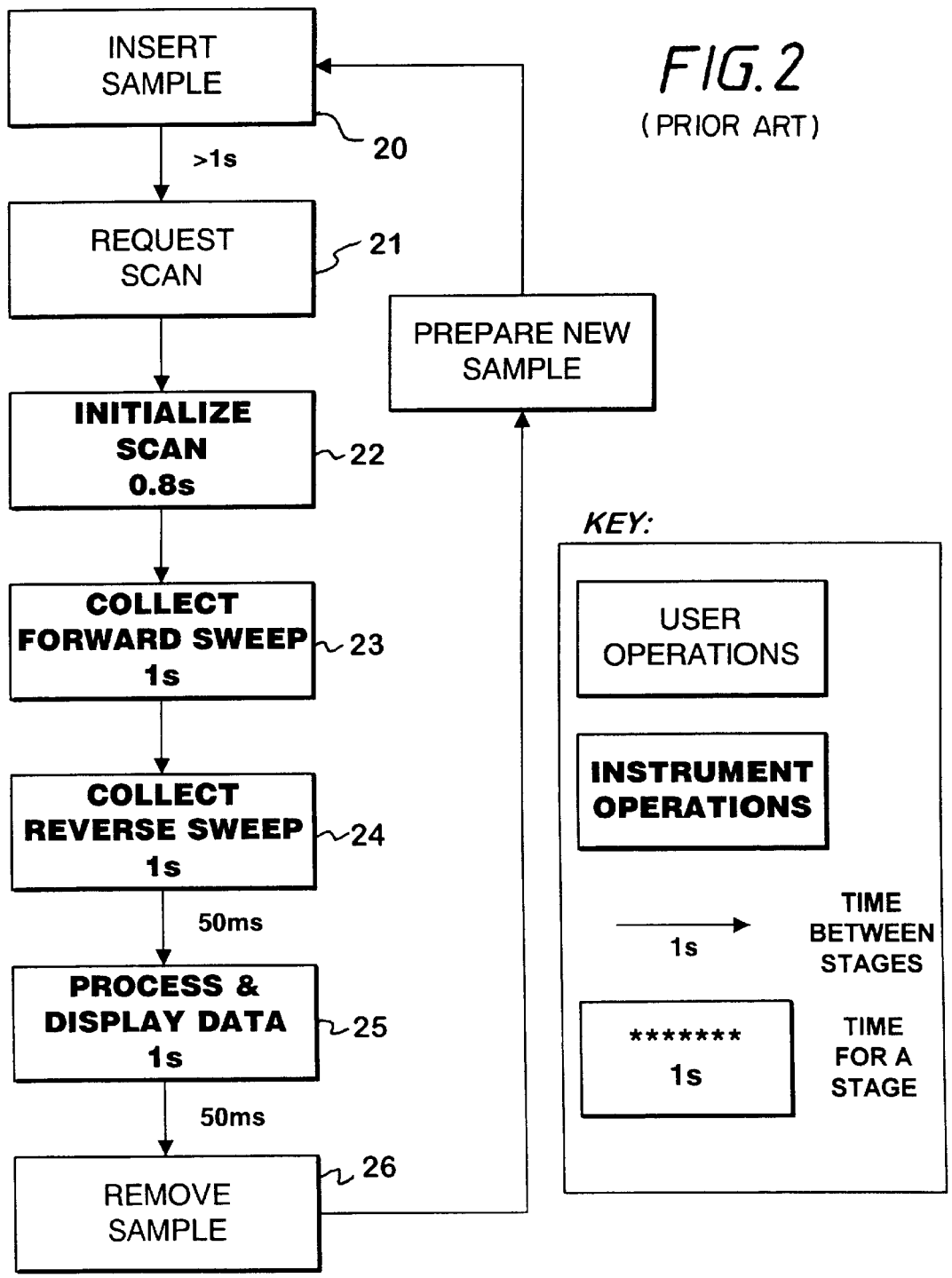
FIG. 2 is a block diagram illustrating the conventional operation of a spectrometer

Looking now at FIG. 2 of the drawings, the known way of obtaining a sample measurement comprises inserting a sample into the sample station (20), requesting (21) a scan by giving the appropriate instruction to the machine by way of the processor, initialising (22) the scan, collecting data from the forward sweep (23), collecting data from the reverse sweep (24), processing that data (25) and displaying it on an appropriate display device such as the monitor of a PC, followed by removal of the sample (26). This can then be repeated for additional samples. It is assumed in the above description that what is known as a "background scan" has always been carried out. In order to obtain the spectrum of the sample under investigation it is first necessary to carry out a background scan and obtain a spectral measurement without the sample in place. This data is stored by the processor and used to ratio out the instrument response in order to obtain the spectrum of the sample. It will also be seen that instrument operations are initiated by a user and, in general terms, in conventional operation the instrument is never ready to make a measurement immediately as the interferometer always has to move to the start of the first scan. It takes a finite amount of time, typically greater than 1 second, for the user to complete the sample insertion, and move to the controlling PC to request a scan. Typically the total time for a measurement will is around 5 seconds, assuming that a measurement comprises a single forward sweep, followed by a single reverse sweep.

Figure 3:
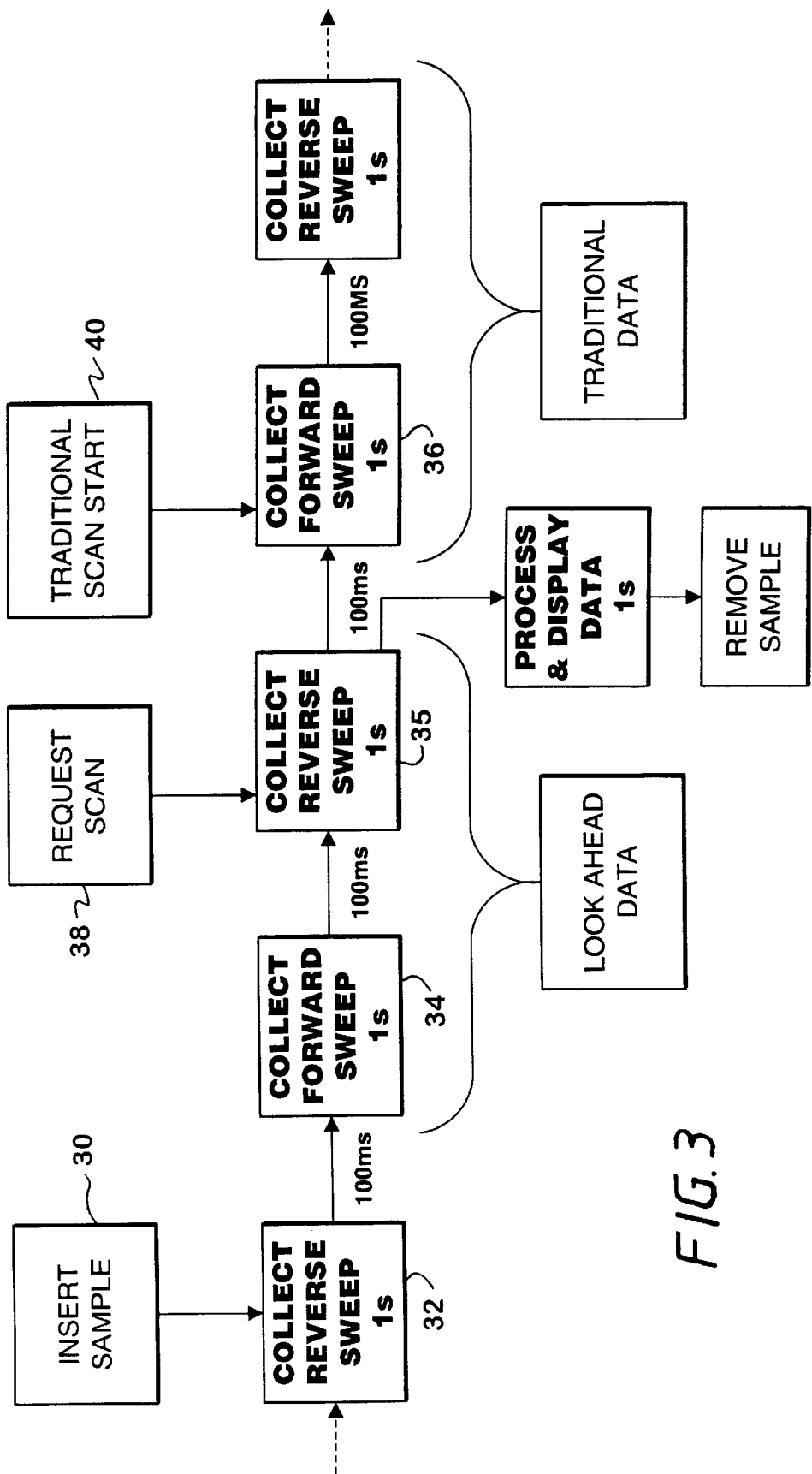
FIG. 3 is a block schematic diagram illustrating one embodiment of the present invention.

Turning now to FIG. 3 there is illustrated a first embodiment in accordance with the present invention. A first feature of this embodiment and all embodiments to be described is that the spectrometer is set to scan continuously and it is therefore collecting data on a continuous basis. Some or all of the data being collected is stored for a finite period of time in a memory in the processor. Thus, with reference to FIG. 3 of the drawings, when a sample is inserted into the sample station as illustrated by block 30, the instrument will be carrying out a sweep in this case it is collecting a reverse sweep as illustrated at block 32. This will be followed by the collection of a forward sweep 34, the subsequent collection of another reverse sweep (35) and further forward sweep (36) and so on. At time (38) the operator issues a command to request a scan. This is illustrated as occurring during the collection of a reverse sweep (35).

As can be seen from FIG. 3, although the command requesting a scan was not given until the sweep 35 is underway. Because the spectrometer is operating in a continuous mode, data collected during the forward sweep 34 and the reverse sweep 35 can be used by the processor to display the spectral data. If the request scan instruction (38) is within 1 second of the start of the sweep 35, that sweep is accepted as being a real sample data. Also the data from sweep 34 is read back and compared with that from sweep 35. If the data are the same then sweeps 34 and 35 are contained to form a single scan. This is in contrast to the traditional arrangement in which the scan would not start until the point illustrated by block 40 and hence only sweeps subsequent to the instruction of the command could be used. In the arrangement of FIG. 3 it is assumed that the operator has already previously requested and obtained a background scan in the manner already described for the conventional route. This background data will have been stored and used to ratio out the instrument response in order to obtain the spectral data relating to the sample.

It is assumed also in relation to FIG. 3 that measurements require matched forward and reverse sweeps, that is to say, one scan which equals one forward and one reverse sweep. Because the instrument is continuously scanning, the interferometer does not have to move to the start of the first scan when a scan request is issued.

As can be seen from FIG. 3 the data is obtained at approximately the same time that a scan is initiated in the traditional operation. Thus, major time savings are obtained in the time taken for the user to complete sample insertion and request a scan. Thus, there is a significant perceived response in this improvement.

Figure 4:
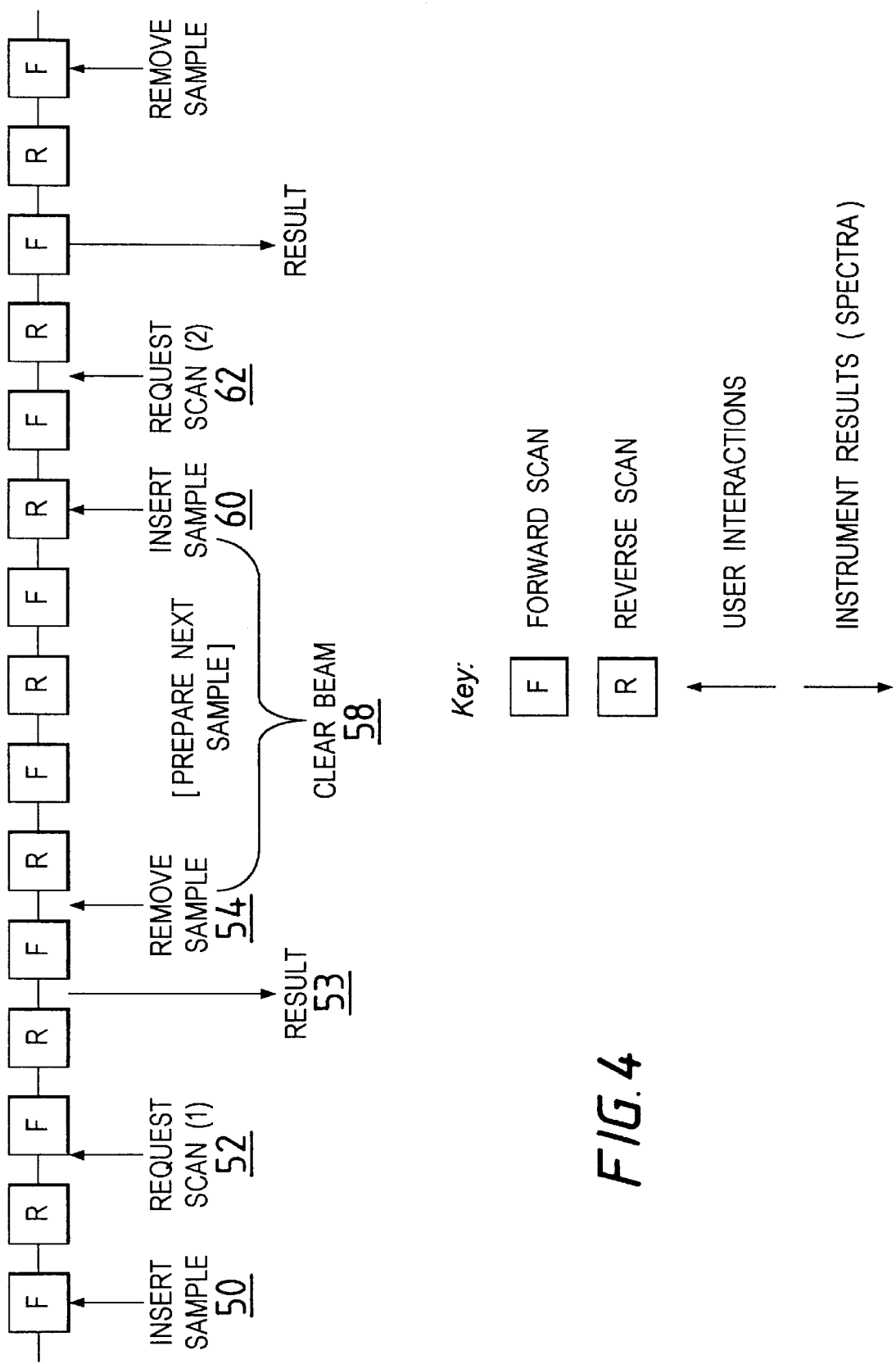
FIG. 4 is a block diagram illustrating another example of the present invention.

Turning now to FIG. 4 there is illustrated an example of a way in which the present invention can be employed in order to obtain automatic background measurements. The continuous forward and reverse sweeps in FIG. 4 are illustrated by the letters "F" and "R". In FIG. 4 a sample is inserted at point 50 and the request for a scan is given at point 52. A result is obtained at 53 and the sample is removed at point 54.

During preparation of the next sample the instrument automatically carries out measurements with a clear beam as illustrated at 58. This means that when the next sample is inserted at point 60 background measurements are already available, and hence, in this method the instrument can examine recent past data stored in the memory in the processor in order to obtain some scans where the instrument was in the clear beam state. This background data can then be employed in order to ratio out the instrument response as will be apparent to those skilled in the art. Thus in the example shown there is no need to acquire a background between the scan requests 50 and 62 and this provides timesaving of the order of up to one minute.

Figure 5:
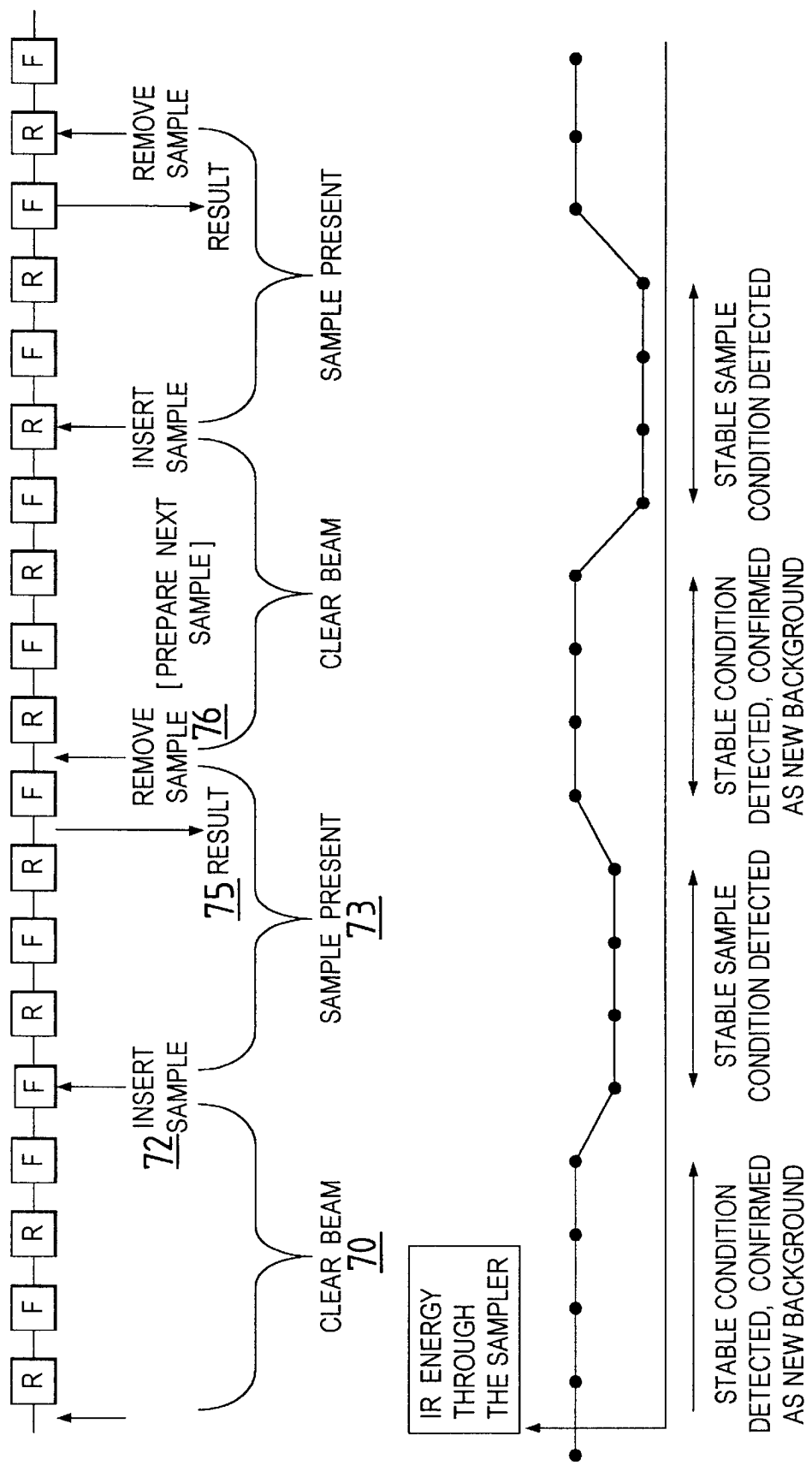
FIG. 5 is a block diagram illustrating a further way of operating the present invention.

Turning now to FIG. 5 there is illustrated a method of operation in which scans are initiated automatically ie without an operator having to issue a start scan instruction. Again, the continuous sequence of scans is represented by the letters "R" and "F". At section 70 the beam is clear and any data obtained at this stage is treated as background data. The sample is inserted at point 72. The system is arranged automatically to sense a change in a characteristic of the acquired data which is recognised as the presence of a sample (73). At point 75 the result is output and the sample is removed at point 76. This will be followed by a further period of clear beam and insertion of the next sample.

The way in which the system can automatically recognise insertion of a sample will now be described. Broadly speaking the system is arranged to recognise a change in a characteristic of data being obtained. In the current example this is a measure of the energy associated with the scan. Thus the system is arranged to tag data relating to each scan with an estimate of the beam energy detected by the detector. Looking at FIG. 6 this illustrates the beam energy for a series of sweeps identified by numbers 1–10. It can be seen that at least for the sweeps 1–3 the energy remains constant indicating no sample is present. By sweep 5 the energy has fallen indicating that a sample has been inserted. This can be recognised by the system as insertion of a sample so that at this point the system automatically carries out a measurement to provide the result as indicated in FIG. 5. What is not absolutely clear from FIG. 5 is whether the sweeps 4 and 6 can be used. In general terms the system should be arranged so that sweeps 1 and 3 are accumulated as are sweeps 7–10 but sweep 5 can be discarded since it is clearly not useful data. If necessary sweeps 4 and 6 can be analysed in more detail by a PC to assess whether they represent usable data.

It will be appreciated that parameters other than energy can be used to detect the presence of a sample. For example, this could be by a mathematical comparison of subsequent measurements.

Figure 6:
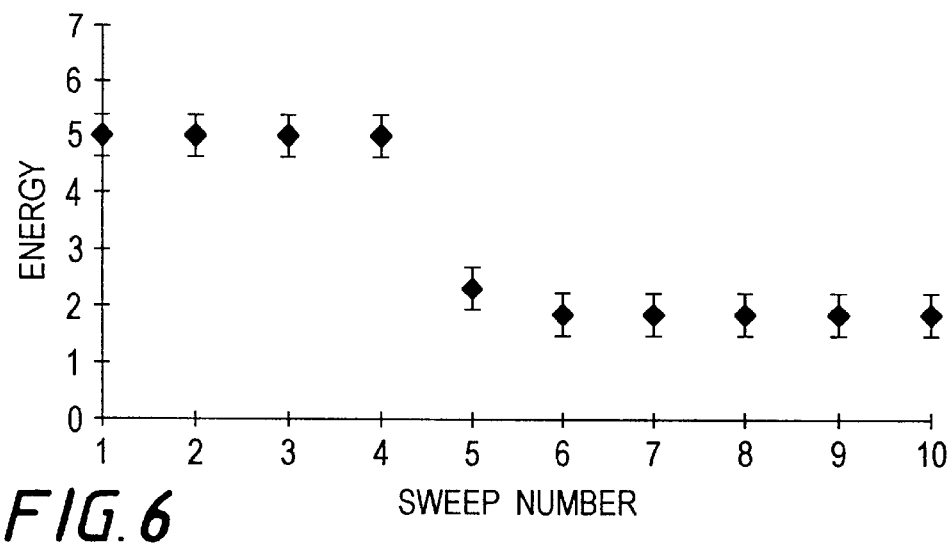
FIGS. 6, 7 and 8 are graphs illustrating the operation of the present invention.
Figure 7:
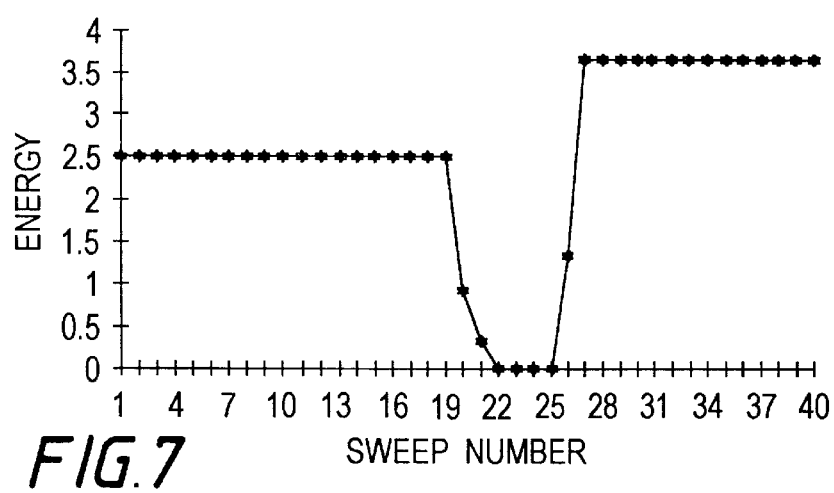
Figure 8:
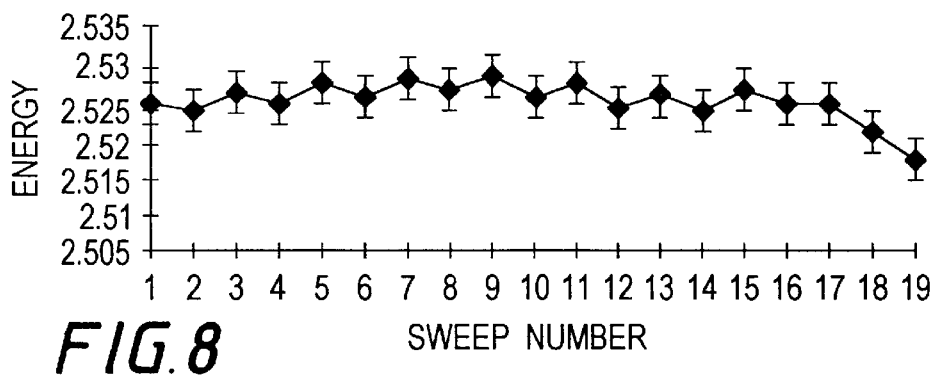

The arrangements shown in FIG. 6 is in effect a simple single threshold scheme and in practice will need elaboration to handle both the direction dependence of the energy and sample drift. The implementation can be enhanced by using a two threshold system with a narrow threshold to identify data that can be accumulated and a wider threshold used to identify sample insertion or removal. The two threshold arrangement is illustrated in FIG. 7 of the drawings. The particular sample shown in FIG. 7 is that for polystyrene. FIG. 8 shows an expansion of the initial part of the sweep data from FIG. 7 and this illustrates variants of the energy with sweep direction. The error bars denote a +/−0.0025 energy variation which is about one part per thousand and match the direction dependent variation. It appears that sample removal is in progress by sweep 18 and therefore sweep 17 will require checking to see whether it represents usable data.

It will be appreciated that any memory provided to store data from the scans has a finite capacity and it is necessary to employ algorithms which reduce the amount of data stored if the memory begins to fill up. Possible ways of implementing this are as follows:

1. accumulation of sweeps with a high degree of confidence that are identical
2. discard of intermediate sweeps obtained during a change of sample or sample settling
3. discard of sweeps from previous samples or backgrounds
4. discard of oldest data.

What is claimed is:

1. A method of operating a spectrometer which comprises a source of analyzing radiation, detector for detecting the analyzing radiation and processing means for processing the output of the detector, said method comprising arranging the spectrometer so that it carries out scans on a continuous basis, continuously obtaining spectral data without a sample in the spectrometer, continuously obtaining spectral data with the sample in the spectrometer, storing spectral data from at least some of the scans with and without the sample in the spectrometer, retrieving an item or items of stored data when carrying out a sample measurement, and calculating a background spectrum based upon the retrieved stored spectral data.

2. A method according to claim 1 including the step of inserting a sample into the spectrometer and generating under operator control an instruction to initiate a scan.

3. A method according to claim 1 including the step of associating with the stored data from each scan, data indicative of a characteristic of the spectral data.

4. A method according to claim 3 wherein the characteristic is the detected energy of a beam.

5. A method according to claim 1 including arranging the processor so that it recognizes automatically introduction of the sample and carries out a measurement accordingly.

6. A method according to claim 1 wherein the stored data relates to background spectral data and sample spectral data.

7. A spectrometer comprising a source of analyzing radiation, a detector for detecting the analyzing radiation, a processor for processing the output of the detector, a spectrometer arrangement for carrying out scans on a continuous basis, a first spectral data in absence of a sample in the spectrometer, a second spectral data based on having the sample in the spectrometer, said processor stores spectral data from at least some of said first and second spectral data scans and retrieving an item or items of stored data when carrying out a sample measurement, and a background spectrum based on the retrieved stored items.

8. A spectrometer according to claim 7 wherein said processor is arranged to generate under operator control an instruction to initiate a scan.

9. A spectrometer according to claim 7 wherein the processor is arranged to associate with the stored data from each scan, data indicative of a characteristic of the spectral data.

10. A spectrometer according to claim 9 wherein the characteristic is a detected energy of a beam.

11. A spectrometer according to claim 9 wherein the processor is arrange so that it recognises automatically the introduction of the sample and carries out a measurement accordingly.

* * * * *